(12) United States Patent
Shkolnikov et al.

(10) Patent No.: US 11,060,958 B2
(45) Date of Patent: Jul. 13, 2021

(54) SAMPLE PREPARATION SYSTEM

(71) Applicant: Hewlett-Packard Development Company, L.P., Houston, TX (US)

(72) Inventors: Viktor Shkolnikov, Palo Alto, CA (US); Anita Rogacs, San Diego, CA (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 192 days.

(21) Appl. No.: 15/770,453

(22) PCT Filed: Feb. 27, 2016

(86) PCT No.: PCT/US2016/019986
§ 371 (c)(1),
(2) Date: Apr. 23, 2018

(87) PCT Pub. No.: WO2017/146744
PCT Pub. Date: Aug. 31, 2017

(65) Prior Publication Data
US 2018/0348106 A1    Dec. 6, 2018

(51) Int. Cl.
*G01N 1/40*    (2006.01)
*G01N 21/65*    (2006.01)
(Continued)

(52) U.S. Cl.
CPC .......... *G01N 1/4044* (2013.01); *B01L 3/5027* (2013.01); *B01L 3/502715* (2013.01);
(Continued)

(58) Field of Classification Search
None
See application file for complete search history.

(56) References Cited

U.S. PATENT DOCUMENTS

| | | | |
|---|---|---|---|
| 5,856,174 A | * | 1/1999 | Lipshutz ............. B01F 11/0071 422/68.1 |
| 6,074,827 A | | 6/2000 | Nelson et al. |

(Continued)

FOREIGN PATENT DOCUMENTS

| | | |
|---|---|---|
| CN | 103398995 | 11/2013 |
| CN | 104549586 | 4/2015 |

(Continued)

OTHER PUBLICATIONS

Quang, et al., "A portable surface-enhanced Raman scattering sensor integrated with a lab-on-a-chip for field analysis", Lab on a Chip, vol. 8, No. 12, Oct. 20, 2008, pp. 2214-2219.

(Continued)

*Primary Examiner* — Lore R Jarrett
(74) *Attorney, Agent, or Firm* — Rathe Lindenbaum LLP

(57) ABSTRACT

A sample preparation system includes a sample input, a first chamber fluidly coupled to the sample input and containing a sample preparation reagent, a second chamber containing a surface enhanced Raman spectroscopy (SERS) sensor structure and a third chamber containing a sensor preparation solution. The sample input, the first chamber and the second chamber are fluidly coupled to one another in a series and the third chamber is fluidly coupled to the third chamber outside of the series so as to sequentially direct a sample received by the sample input through the first chamber to the second chamber and out of the second chamber and so as to direct the sensor preparation solution into the second chamber following discharge of the sample out of the second chamber.

19 Claims, 6 Drawing Sheets

(51) Int. Cl.
*B01L 3/00* (2006.01)
*G01N 21/64* (2006.01)

(52) U.S. Cl.
CPC ......... *G01N 1/4077* (2013.01); *G01N 21/658* (2013.01); *B01L 2200/0678* (2013.01); *B01L 2200/16* (2013.01); *B01L 2300/0627* (2013.01); *B01L 2300/0681* (2013.01); *B01L 2300/087* (2013.01); *B01L 2300/0816* (2013.01); *B01L 2400/0475* (2013.01); *B01L 2400/0478* (2013.01); *B01L 2400/0487* (2013.01); *B01L 2400/06* (2013.01); *G01N 21/648* (2013.01); *G01N 2001/4088* (2013.01)

(56) References Cited

U.S. PATENT DOCUMENTS

| | | | |
|---|---|---|---|
| 6,143,247 A * | 11/2000 | Sheppard, Jr. | B01F 13/0059 210/109 |
| 2001/0055812 A1 | 12/2001 | Mian et al. | |
| 2002/0051971 A1 * | 5/2002 | Stuelpnagel | B01J 19/0046 435/6.11 |
| 2003/0120137 A1 | 6/2003 | Pawluczyk | |
| 2005/0041525 A1 | 2/2005 | Pugia et al. | |
| 2008/0213872 A1 | 9/2008 | Regan | |
| 2009/0021728 A1 | 1/2009 | Heinz et al. | |
| 2010/0300563 A1 * | 12/2010 | Ramunas | G01N 35/00 137/565.01 |
| 2011/0294691 A1 * | 12/2011 | Erickson | G01N 21/658 506/9 |
| 2011/0315902 A1 * | 12/2011 | Wu | B01L 3/502715 250/576 |
| 2012/0067433 A1 | 3/2012 | Friedrich et al. | |
| 2012/0136492 A1 | 5/2012 | Amin et al. | |
| 2012/0327408 A1 | 12/2012 | Guo et al. | |
| 2013/0203634 A1 * | 8/2013 | Jovanovich | B01L 3/502738 506/26 |
| 2013/0316464 A1 | 11/2013 | Pettigrew et al. | |
| 2014/0370519 A1 | 12/2014 | Vangbo et al. | |
| 2016/0016140 A1 | 1/2016 | Jovanovich et al. | |

FOREIGN PATENT DOCUMENTS

| | | |
|---|---|---|
| WO | WO-0107892 A1 | 2/2001 |
| WO | WO-2014111064 A1 | 7/2014 |
| WO | WO-2015084458 A2 | 6/2015 |

OTHER PUBLICATIONS

International Search Report and Written Opinion dated Nov. 29, 2016, PCT Patent Application No. PCT/US2016/019986, filed Feb. 27, 2016, Korean Intellectual Property Office.

Liu Shaogen et al., "Flexible SERS substrates-based in situ method for rapid detection of environmental pollutant," Aug. 31, 2014, Academic Journal of Environment Science, vol. 34, No. 8.

* cited by examiner

SAMPLE PREPARATION SYSTEM

CLAIM FOR PRIORITY

The present application is a national stage filing under 35 U.S.C. § 371 of PCT application number PCT/US2016/019986, having an international filing date of Feb. 27, 2016, the disclosure of which is hereby incorporated by reference in its entirety.

BACKGROUND

Complex samples often comprise complicated matrices of small molecules. Facilitating the detection of a particular molecule or a particular set of analytes in a complex sample may involve a highly technical and tedious sample preparation process. For example, preparation of such a complex sample for analysis by surface enhanced Raman spectroscopy may involve extraction of the particular molecule or analyte of interest.

DETAILED DESCRIPTION OF EXAMPLES

Disclosed herein are different examples of sample preparation systems that may facilitate faster and less costly preparation of a sample for analysis. The example sample preparation systems sequentially drive or move a sample through multiple chambers as the sample, in combination with the different reagents or solutions within the different chambers, undergoes chemical changes. In some implementations, additional sample modifying solutions or sensor preparation solutions are injected into the series of chambers in an automatic timed relationship to the movement of the sample through the series of chambers. Although some of the implementations are described with respect to surface enhanced Raman spectroscopy and flourescence sensing, the disclosed example sample preparation systems may be employed in a variety of different applications where a sample is to be prepared prior to being tested and analyzed.

Figure 1:
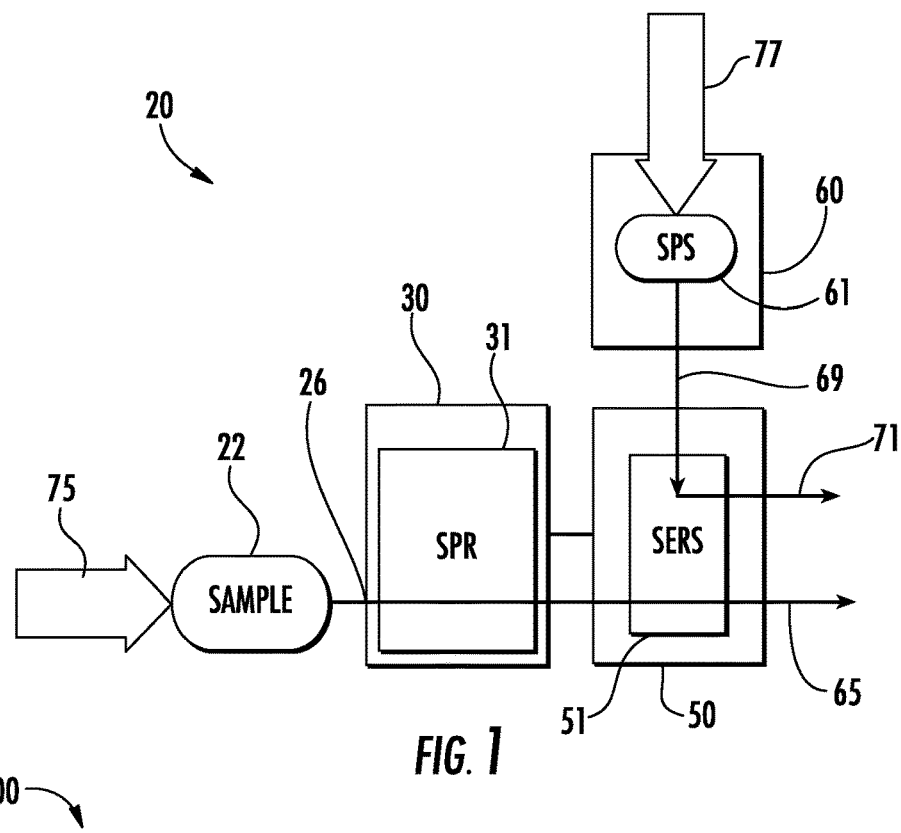
FIG. 1 is a schematic diagram of an example sample preparation system.

FIG. 1 schematically illustrates an example sample preparation system 20 which may facilitate faster and less costly preparation of a sample for analysis. Sample preparation system 20 compares a sample for analysis by surface enhanced Raman spectroscopy (SERS) by sequentially moving or driving a sample 22 through a series of chambers, wherein each chamber contains either a sample preparation reagent or an SERS sensing structure. Based on the timing at which the sample is driven through the series of chambers, a sensor preparation solution is moved onto the sensing structure to further facilitate sensing of the sample.

As shown by FIG. 1, sample preparation system 20 comprises sample inlet 26, sample preparation chamber 30, sensing chamber 50 and sensor preparation chamber 60. Inlet 26 comprises an opening through which sample 22 may be injected or inserted into system 20. In the example illustrated, inlet 26 connects directly to sample preparation chamber 30. In other implementations, inlet 26 may be directly connected to an intermediate chamber, such as a temporary sample holding chamber which itself is connected directly to sample preparation chamber 30.

Sample preparation chamber 30 comprises a chamber having a volume containing sample preparation reagent 31. In one implementation, chamber 30 is prefilled with sample preparation reagent (SPR) 31 at a point of manufacture for example, in one implementation, sample preparation chamber 30 may include a port through which chamber 30 is filled with reagent 31, wherein the port is "factory sealed".

The sample preparation reagent 31 comprises a substance that interacts with receive sample 22 to prepare the sample 22 for subsequent sensing through SERS. In one implementation, sample preparation reagent 31 may comprise a solution or substance that facilitates molecular extraction of substances from the sample. In one implementation, sample preparation reagent 31 may comprise a solution or substance that facilitates a precipitation of certain molecules or components from the received sample 22. For example, in one implementation, preparation reagent 31 may comprise trichloroacetic acid (TCA) In one implementation, sample preparation reagent 31 may comprise a solution that alters the pH of the sample or buffers the sample 22. For example, in one implementation, sample preparation reagent 31 may comprise sodium hydroxide (NaOH).

In some implementations, system 20 may comprise multiple sample preparation reagent containing chambers in series between inlet 26 and sensing chamber 50, For example, in some implementations, system 20 may comprise a first sample preparation chamber prefilled with a substance to precipitate unwanted components from the sample and a second sample preparation chamber prefilled with a solution or substance to alter or adjust the pH of the sample. In one implementation system 20 may comprise a first chamber containing trichloroacetic acid (TCA), a second chamber in series with the first chamber and containing NaOH, and a filter therebetween to inhibit the flow of the precipitate from the first chamber to the second chamber. In yet other implementations, the individual sample preparation chamber 30 or the multiple, in series sample preparation chambers 30 may contain other sample preparation reagents that interact and alter the sample 22 in other fashions to prepare the sample for sensing and sensing chamber 50. In other implementations, system 20 may comprise 3 or even a greater number of sample preparation chambers in series.

Sensing chamber 50 comprises a chamber that receives the prepared sample 22 and that is in series with sample preparation chamber 30 and inlet 26 such that sample 22 may be sequentially moved through and across chambers 30 and 50. In one implementation, each of the chambers of the series are separated by a one-way valve to inhibit backflow. In other implementations, other backflow inhibiting mechanisms or structures may be employed. Sensing chamber 50 provides a volume where the prepared sample is sensed. In the example illustrated in which system 20 facilitates the sensing of sample 22 through SERS, chamber 50 contains SERS structure 51.

SERS structure 51 (schematically illustrated) comprises structures that may include a metal surface or structure, wherein interactions between the analyte and the metal surface cause an increase in the intensity of the Raman-scattered radiation. Such metal surfaces may include a roughened metal surface, such as periodic gratings. In another implementation, such metal surfaces may comprise assembled nanoparticles. In some implementations, such metal surfaces may comprise metal islands. In one implementation, such metal islands comprise flexible columnar supports such as pillars, needles, fingers, particles or wires. In some implementations, the flexible columnar structures may include a metal cap or head upon which an analyte may be deposited. In some implementations, such columnar structures are formed from materials and/or are dimensioned so as to bend or flex towards and away from one another in response to applied electric fields. In some implementations, the SERS structures are movable and are self-actuating, wherein such columnar structures bend or flex towards one another in response to micro-capillary forces so as to self-organize, wherein such bending facilitates close spacing between the structures for greater scattered radiation intensity.

In some implementations, the columnar structures are electrically conductive such that the columnar structures and/or their metal caps or heads provide distinct charging points intensifying the generated electric field at distinct points to enhance attraction of the charged ions of the analyte to the columnar structures of structure 51. For example, in some implementations, the columnar structures are formed from an electrically conductive polymer such as Poly(3,4-ethylenedioxythiophene) or PEDOT (or sometimes PEDT), a conducting polymer based on 3,4-ethylenedioxythiophene or EDOT monomer. In one implementation, the SERS structures have a nanometer scale to facilitate nano-enhanced Raman spectroscopy (NERS). Such nano-scale NERS structures may increase the intensity of radiation scattered by the analyte adsorbed on such structures by a factor as high as $10^{16}$. In yet other implementations, such columnar structures may be formed from non-electrically conductive materials, such as non-electrically conductive polymers, or may be formed from metal materials, such as wire filaments or the like.

Sensor preparation chamber 60 comprises a chamber connected to the series formed by the inlet 26, sample preparation chamber 30 (and any other additional in series sample preparation chambers) and sensing chamber 50. Sensor preparation chamber 60 is prefilled with a sensor preparation solution (SPS) 61 that interacts with SERS structure 51 to enhance sensing by SERS structure 51. Sensor preparation chamber 60 is connected to sensor chamber 50 and is selectively openable and closable such that the provision of SPS 61 to sensor chamber 50 may be selectively controlled and timed with respect to the movement of sample 22 into and/or through sensor chamber 50. In one implementation, sensor preparation chamber 60 is closed (or sensor chamber 50 is closed) to inhibit the provision of SPS 61 into sensor chamber 50 until after the prepared sample has been moved across and over the SERS structure 51 and out sensor chamber 50. In the example illustrated, SPS prepares SERS structure 51 for sensing after the prepared sample has passed through and across SERS structure 51 and out of chamber 50. In one implementation, SPS 61 comprises a solution that "washes" SERS structure 51, wherein the nano fingers of SCR structure 51 close upon being dried. In one implementation, SPS 61 comprises ethanol (EtOH).

Figure 2:
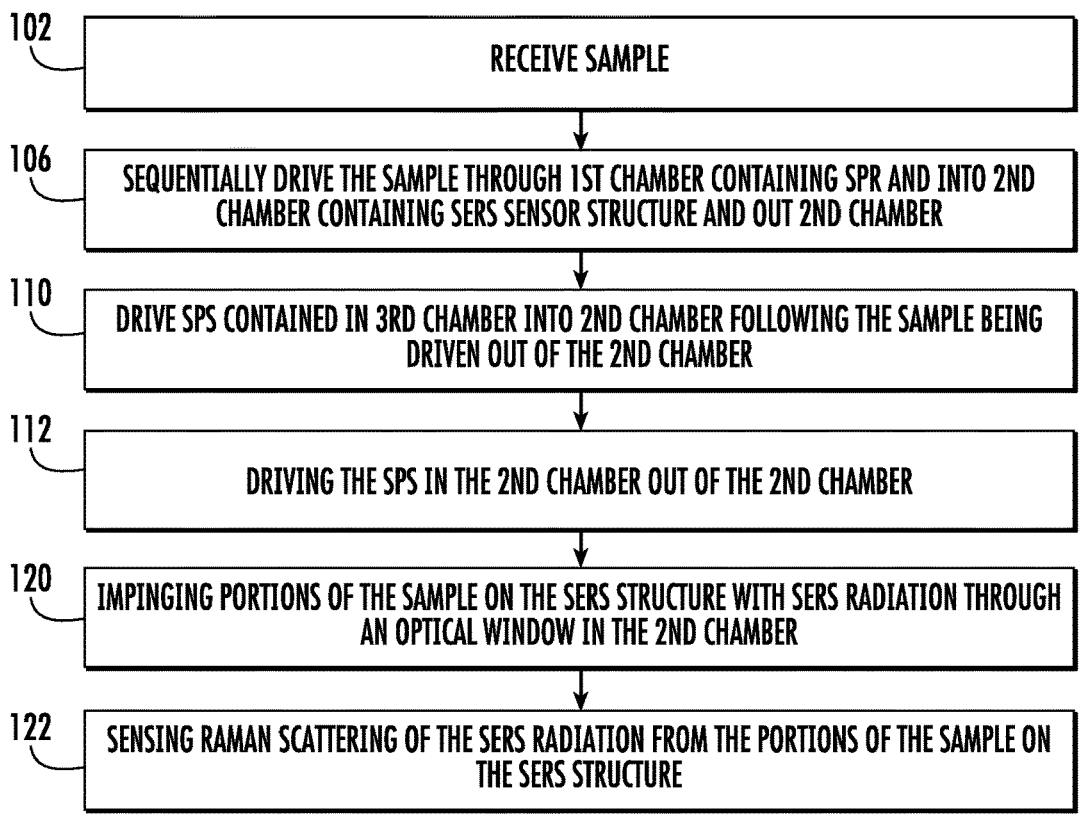
FIG. 2 is a flow diagram of an example method for sensing a sample.

FIG. 2 is a flow diagram of an example method 100 of preparing and sensing a sample. Although method 100 is described as being carried out by system 20, method 100 may alternatively be carried out by any of the other sample preparation system described hereafter or by other appropriate sample preparation systems. As indicated by block 102, system 20 receives a sample, such as sample 22, to be analyzed using SERS.

As indicated by block 106, system 20 sequentially drives sample 22 through a first chamber, sample preparation chamber 30, containing SPR 31 and into a second chamber, sensor chamber 50, containing SCR sensor structure 51, and then out of sensor chamber 50 as indicated by arrow 65 in FIG. 1. During the sequential movement of sample 22 through the different chambers 30, 50, sample 22 may temporarily stationarily reside within such chambers 30, 50 for predetermined periods of time. In some implementations, the period of time during which sample 22, undergoing preparation, resides within chamber 30 (or other additional sequential chambers containing sample preparation reagents) and within sensor chamber 50 may vary with respect to one another.

As indicated by block 110, the SPS 61 contained within chamber 60 is driven into the second chamber, sensor chamber 50, as indicated by arrow T9 in FIG. 1. In some implementations, SPS 61 is allowed to temporarily stationarily reside within chamber 50, submersing and soaking SERS structure 51. In one implementation, SPS 61 is driven or moved into sensor chamber 50 beginning after the prepared sample has already contacted and flowed across SERS structure 51 and after the prepared sample has subsequently exited sensor chamber 50, leaving the target analyte of sample 22 bound on (and potentially within) the SERS structure 51.

As indicated by block 112 and as indicated by arrow 71 in FIG. 1, after SPS 61 has resided within sensor chamber 50 for a predetermined amount of time, SPS 61 is further driven out of the second chamber, sensor chamber 50. As a result, the sample within sensor chamber 50 and upon SERS structure 51 may be ready for being sensed. In some implementation, SERS structure 51 may be further dried after discharge of SPS 61 from sensor chamber 50. In some implementations, remaining liquid within sensor chamber 50 is permitted to naturally evaporate before sensing. In another implementation, such evaporation is accelerated through the use of driven air or other gas or the provision of heat by heaters.

Because sample 22 is sequentially driven or moved through and across chambers 30 and 50 and out of sensor chamber 50, additional procedures such as removing and transporting a sample between different stations may be reduced in number or eliminated. Because chamber 30 is prefilled with SPR 31 (and because other additional sequential chambers are filled with their corresponding sample preparation reagents, system 20 is ready for use. Similarly, because sensor preparation chamber 60 is connected to sensor chamber 50 and is prefilled with SPS 61, SPS 61 does not need to be retrieved, but is ready and available to prepare the sensor for subsequent sensing. The opportunity for mistakes resulting from the use of incorrect sample preparation reagents or sensor preparation solutions is reduced, allowing lesser skilled technicians to carry out such analysis.

In one implementation and as indicated by the larger arrows 75 and 77 in FIG. 1, the movement of sample 22 across the series of chambers 30, 50 and the movement of SPS 61 into sensor chamber 50 is automatically carried out in a timed fashion such that SPS 61 is not provided to sensor chamber 50 until after discharge of the prepared sample out of sensor chamber 50. As a result, the opportunity for sample 22 being modified and prepared out of order by different sample preparation reagents as well the opportunity for the provision of SPS 61 out of order with respect to the flow of sample 22 across chamber 30 and 50 is reduced, allowing lesser skilled technicians to carry out such analysis.

In one implementation, the movement of sample 22 and SPS 61 may be carried out without physical contact with the sample, wherein movement of the sample is facilitated or influenced through the use of air pressure or gas pressure. In one implementation, the automatic and timed movement of sample 22 and SPS 61 and carried out by a computer control unit that selectively and sequentially controls gas pumps or which controls other forms of pumps, such as thermal resistive or piezoresistive bubble jet pumps or nozzles to time sequential movement of sample 22 through chamber 30, 50 and the timed release or discharge of SPS 61 into sensor chamber 50 and out of sensor chamber 50. In yet other implementations, the movement of sample 22 and SPS 61 may be carried out through the use of plungers, a first plunger for driving sample 22 and a second plunger for driving SPS 61. In one implementation, the plungers may be operably connected to one another, such as by a rack and pinion arrangement, such that the second plunger is driven by motion of the first plunger and is timed with respect to the positioning of the first plunger to drive SPS 61 into chamber 50 following the sample being driven out of sensor chamber 50. In some implementations, the plungers may be manually driven, wherein the timing at which sample 22 and SPS 61 are driven is automatically linked or controlled.

As indicated by block 120, once remaining sample within and upon SERS structure 51 within sensing chamber structure 50 is ready, the portions of the prepared sample 22 remaining on SERS structure 51 are impinged with SERS radiation through an optical window within chamber 50. For example, in one implementation, the SERS radiation may have a wavelength of between 500 and 900 nm. In one implementation, the SERS radiation has a wavelength of a visible light. In one particular implementation, the SERS radiation has a wavelength of 785 nm. In another implementation, the SERS radiation has a wavelength of 687 nm. In other implementations, the SRS radiation may have other wavelengths.

As indicated by block 122, the Raman scattering of the SERS radiation from the portions of the sample on the SERS structure 51 are sensed by Raman detector. In one implementation, the Raman scattering of the SERS radiation passes through the same optical window or a different optical window of sensor chamber 50, wherein the Raman scattering is focused, filtered and/or modified and directed by a Raman spectrometer onto a Raman collector such as a charge coupled device (CCD), an electron multiplying charge coupled device (EMCCD), a complementary metal-oxide semi-conductor (CMOS) device or a photomultiplier tube (PMT). The collected Raman scattering may be compared to previously captured and stored Raman Spectra fingerprints or IDs of substances to facilitate identification of characteristics of the target substances of sample 22.

Figure 3:
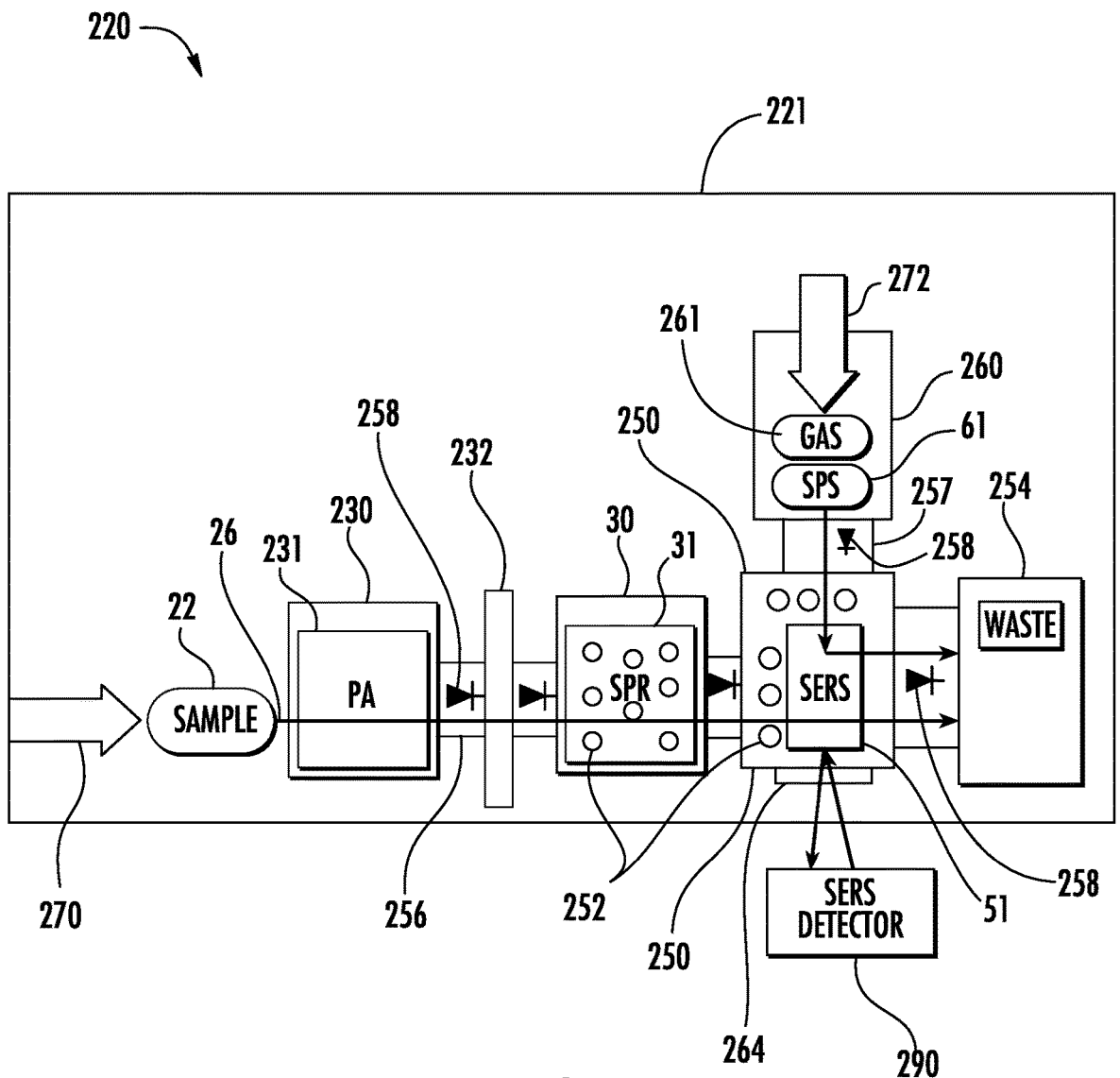
FIG. 3 is a schematic diagram of an example sample preparation and sensing system.

FIG. 3 schematically illustrates an example sample preparation system 220, a particular implementation of the example system 20. Sample preparation system 220 is similar to system 20 except that system 220 is specifically illustrated as a single platform or self-contained unit 221 comprising inlet 26 into sample preparation chamber 230, filter 232, sample preparation chamber 30 and its contained, prefilled SPR 31 (described above) sensor chamber 250, mixers 252, waste chamber 254 and a sensor preparation chamber 260. Chambers 230, 30, 250 and 254 are each fluidly coupled to one another by intervening conduits or passages 256 so as to form a series of chambers through which sample 22 may be driven or moved. Similarly, chamber 260 is fluidly coupled to chamber 250 by a conduit 257.

For purposes of this disclosure, the term "coupled" shall mean the joining of two members directly or indirectly to one another. Such joining may be stationary in nature or movable in nature. Such joining may be achieved with the two members or the two members and any additional intermediate members being integrally formed as a single unitary body with one another or with the two members or the two members and any additional intermediate member being attached to one another. Such joining may be permanent in nature or alternatively may be removable or releasable in nature. The term "operably coupled" shall mean that two members are directly or indirectly joined such that motion may be transmitted from one member to the other member directly or via intermediate members. The term "fluidly coupled" shall mean that two or more fluid transmitting volumes are connected directly to one another or are connected to one another by intermediate volumes or spaces such that fluid may flow from one volume into the other volume.

In the example illustrated, each of such conduits 256 and 257 include a one-way valve 258 which provides unidirectional flow of liquid in the direction indicated by the schematically illustrated arrow of each valve 258. In other implementations, other forms of valves or the like may be employed to inhibit backflow amongst the chambers through conduit 256 and/or 257. Although conduits 256 and 257 illustrate direct connection between the associated chambers, in other implementations, two consecutive first and second chambers may feed to a separate mixing chamber, wherein the mixing chamber is connected to the a third chamber in the series.

Sample preparation chamber 230 is similar to sample preparation chamber 30 described above in that sample preparation chamber 230 contains a substance or solution to facilitate preparation of sample 22 for sensing in sensing chamber 250. In the example illustrated, sample pressurization chamber 230 comprises a sample preparation reagent in the form of a precipitation agent (PA) 231. In one implementation, chamber 230 is prefilled with a precipitation agent 231 at a point of manufacture. For example, in one implementation, sample preparation chamber 230 may include a port through which chamber 230 is filled with precipitation agent to 31, wherein the port is "factory sealed" after such filling. In one implementation, the precipitation agent 231 comprises trichloroacetic acid (TCA). In other implementations, the precipitation agent 231 may comprise other substances or solutions.

Filter 232 extends across conduit 256 between chambers 230 and 30. Filter 232 has filter openings sized and spaced such that components or species precipitated out of sample 22 by precipitation agent 231 cannot pass or are substantially blocked from flowing into sample preparation chamber 30. Filter 232 separates the precipitate from the rest of the solution, the precipitate comprising species that might otherwise interfere with sensing of sample 22. In one implementation, filter 232 is formed from polytetrafluoroethylene and has 100 nm sized pores. In some implementations, system 220 may comprise multiple filters 232 between chambers 230 and 30, each of the filters gradually filtering out smaller size precipitate from sample 22. In yet other implementations, filter 232 may be omitted such as where the precipitate settles in chamber 230 or in other settling chambers between chamber 230 and chamber 30.

Chamber 30 is described above. Chamber 30 contains sample preparation reagent 31. In the particular example illustrated, sample preparation reagent 31 comprises a non-specific binding inhibitor. In one implementation, SPR 31 comprises a solution or substance that alters the pH of sample 22. In one implementation, SPR 31 comprises NaOH. In other implementations, SPR 31 may comprise other solutions which alter the pH of sample 22 in other fashions or which alter the chemical characteristics of sample 22 in other fashions.

Sensor chamber 250 is similar to sensor chamber 50 in that sensor chamber 250 contains SERS structure 51 (described above). Sensor chamber 250 is additionally illustrated as comprising optical window 264. Optical window 264 facilitates the transmission of SERS radiation through window 264 from an external SERS detector 290 to impinge SERS structure 51. Optical window 264 further facilitates the transmission of scattered SERS radiation, resulting from impingement of the remaining portions of the sample 22 on the SERS structure 251, out of chamber 250 to SERS detector 290. SERS detector 290 receives Raman scattering. Detector 290 may focus, filter and/or modify the Raman scattering which is directed onto a Raman collector such as a charge coupled device (CCD), an electron multiplying charge coupled device (EMCCD), a complementary metal-oxide semi-conductor (CMOS) device or a photomultiplier tube (PMT). The collected Raman scattering may be compared to previously captured and stored Raman spectra fingerprints or IDs of substances to facilitate identification of characteristics of the target substances of sample 22.

Mixers 252 comprise structures or mechanisms that facilitate the mixing of the prepared sample 22 as it is being moved through and across the various chambers. In one implementation, mixers 262 comprise pillars that encourage serpentine flow of liquid. In the example illustrated, mixers 252 are provided in an array within chamber 30 to facilitate mixing of the solution of sample 22 with the sample preparation reagent already contained within chamber 30. In the example illustrated, mixers 252 are additionally provided in sensor chamber 250 to facilitate mixing and serpentine flow of the prepared sample 22 over the SERS structure 51, encouraging kinetic binding of the prepared sample (the analyte) to SERS structure 51, while reducing any diffusional limitations to such binding.

In other implementations, other forms of mixers 252 may be employed in chambers 30 and 250. In other implementations, mixers 252 may be omitted from chamber 250 and/or chamber 30. In some implementations, mixers may be provided in the other chambers of system 220 as well, such as chamber 230.

Waste chamber 254 comprises a volume at the end of the series formed by chambers 230, 30, 250 and 254. Waste chamber 254 receives the prepared sample 22 after the prepared sample 22 has flowed across and over SERS structure 51 in sensor chamber 250. As will be described hereafter, waste chamber 254 additionally receives and contains the sensor preparation solution contained in chamber 260 after the sensor preparation solution 260 has flowed through chamber 250 and across SERS structure 51. Waste chamber 254 provides sanitary containment of the byproducts resulting from the sensing of sample 22. In one implementation, waste chamber 254 has a removable port or outlet facilitating emptying of waste chamber 254. In other implementations, waste chamber 254 is sufficiently large to contain the waste until disposal of the self-contained unit 221.

Sensor preparation chamber 260 is similar to sensor preparation chamber 60 described above except that sensor preparation chamber 260 is additionally illustrated as comprising a gas 261, such as air. Gas 261 may be utilized to facilitate drying of SERS structure 51 to prepare the sample and SERS structure 51 for sensing by detector 290.

According to one example operation, sample 22 is moved through an intervening one-way valve 258 into chamber 230 where sample 22 interacts with precipitation agent 231 to precipitate out of the solution those components or species that may interfere with the subsequent sensing of sample 22. In one implementation in which system 220 is being utilized for melamine detection, chamber 230 may contain the precipitated agent 231 comprising trichloroacetic acid (TCA), for example, 40% v/v (volume ratio; for example 40 ml of TCA to 100 ml of total solution) to precipitate proteins.

The sample 22 is further moved along, such as under the influence of sample driver 270 (schematically shown), through conduit 256 across filter 232. Filter 232 separates out the precipitate, permitting the remaining sample solution, the filter sample solution, to flow through the one-way valve into sample preparation chamber 30.

Continued movement of the sample 22 by driver 270 causes the filter sample 22 within chamber 32 take a serpentine path about the pillars of mixers 252 and to mix with the existing SPR 31. In the example implementation of system 220 being used for melamine detection, SPR 31 may comprise sodium hydroxide. The sodium hydroxide, serving as a non-specific binding inhibitor, creates a high pH solution. The amount of sodium hydroxide is chosen such that after the addition of the sample 22, the mix solution within chamber 230 remains high. In one implementation the volume or strength of SPR 31 is such that the mix solution has a pH greater than 10. The high pH releases any hydrogen bonding of the analyte and hydrolyses any non-precipitated proteins and lipids. Such preparation may facilitate subsequent binding of the analyte (the target substance) onto SERS structure 51 in chamber 250 while inhibiting fouling species or substances for binding to the SERS structure 51.

The sample solution 22 is further driven by driver 270 across the one-way valve and into sensor chamber 250. When within sensor chamber 250, the sample solution 22 is further mixed or swirled across SERS structure 51 by mixers 252. After a sufficient amount of time for incubation and/or binding to the SERS structure 51, driver 270 continues to move the sample solution 22 out of sensor chamber 250, through the one-way valve 258 and into waste chamber 254.

In response to the discharge of sample solution 22 from sensor chamber 250, system 220 automatically activates driver 272 which drives sensor preparation solution 61 through conduit 257, across the illustrated one-way valve 258, into sensor chamber 250. In the example illustrated, sensor preparation solution 61 comprises ethanol. The ethanol washes over SERS structure 51 and is subsequently driven out into waste chamber 254.

Following discharge of SPS 61 out of sensor chamber 250 and into waste chamber 254, driver 272 moves or drives gas 261 over SERS structure 51. In one implementation, gas 261 comprises air contained within chamber 260, wherein the air is pressurized to initially drive SPS 61, followed by the air itself into sensor chamber 250. The gas or air driven across SERS structure 51 accelerates drying of SERS structure 51. In implementations where SERS structure 51 comprises nano fingers, such drying closes the SERS structure nano fingers.

In other implementations, the provision of gas 261 by system 222 to enhance drying may be omitted. In other implementations, the gas may itself be heated to further facilitate drying. In yet other implementations, portions of sensor chamber 250 may be provided with separate heaters, such as electrically resistive heating elements, extending along or embedded within the floor, sides or ceiling of chamber 250, wherein such heaters are selectively actuated to dry structure 51 after SPS 61 has been discharged to waste chamber 254.

Once the nano fingers have sufficiently dried and closed, SERS detector 290 impinges the SERS structure and bound analyte of sample 22 with Raman radiation passing through optical window 264. The analyte bound to SERS structure 52 impacts the scattering of the Raman radiation provided by detector 290. The Raman scattering is reflected back through optical window 264 and directed by detector 292 and its Raman collector for analysis.

Figure 4:
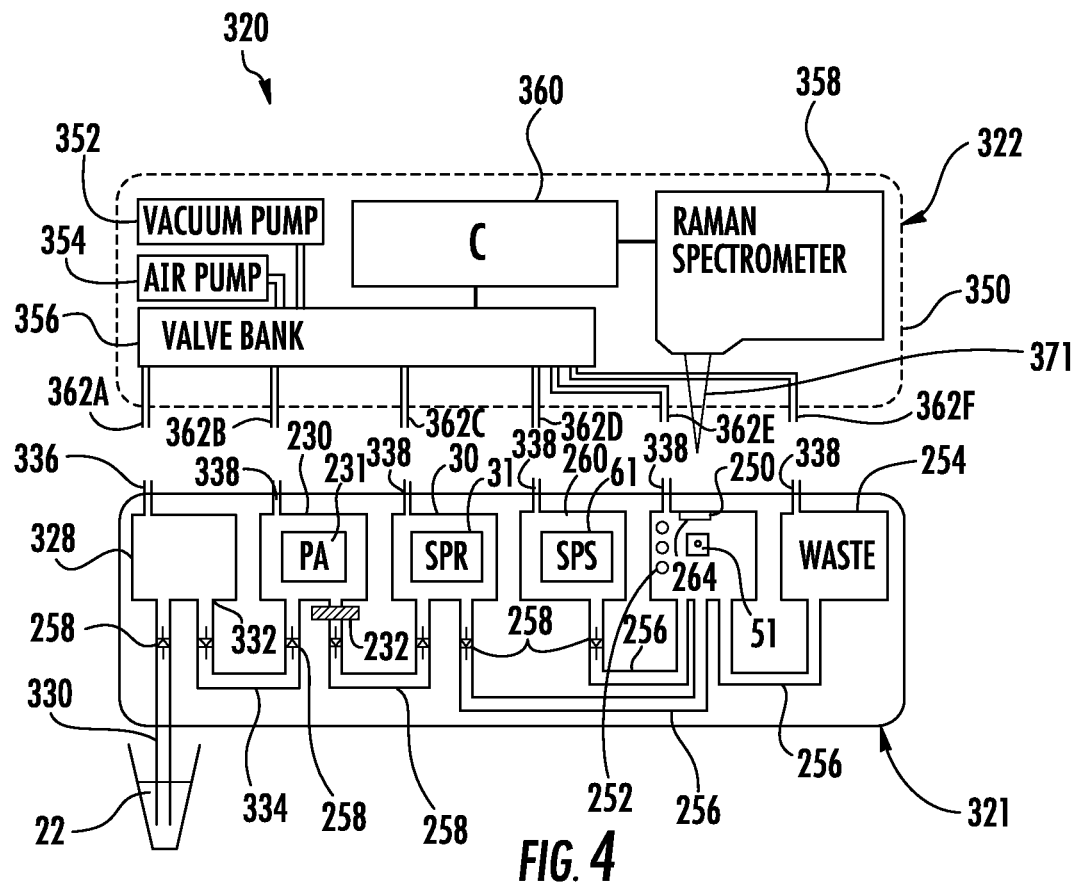
FIG. 4 is a schematic diagram of an example sample preparation and sensing system.

FIG. 4 schematically illustrates sample preparation and sensing system 320. System 320 comprises a pneumatic self-contained device for preparing a sample for analysis for SERS sensing through the extraction of small molecules from complex samples, separating out or removing fouling species that might otherwise interfere with SERS detection. System 320 comprises a two-piece system: (1) disposable cartridge 321 and (2) driving and sensing instrument 322. Disposable cartridge 321 comprise a body in which is provided or supported multiple chambers and conduits, wherein the cartridge 321 is releasably or removably connectable to instrument 322 to facilitate the automatic sequential driving of a sample through the chambers, to facilitate the automatic timed provision of a solution to prepare a sensor within a sensing chamber and to facilitate sensing of a prepared sample within the sensing chamber. For purposes of this disclosure, the term "releasably" or "removably" with respect to an attachment or coupling of two structures means that the two structures may be repeatedly connected and disconnected to and from one another without material damage to either of the two structures or their functioning. In the example illustrated, system 320 is specifically illustrated for carrying out surface enhanced Raman spectroscopy. In other implementations, system 320 may be modified or adapted for use with other detection or sensing procedures.

Disposable cartridge 321 comprises sampling chamber 328, sample preparation chamber 230, filter 232, sample preparation chamber 30, sensing chamber 250, sensor preparation chamber 260 and waste chamber 254. Sampling chamber 328 comprise a volume connected to an inlet tube 330 and having an outlet 332 connected to chamber 230 by a passage or conduit 334, wherein each of tube 330 and conduit 334 contain at least one one-way valve 258. Sampling chamber 328 further comprises an external pressure port 336 for releasable connection to a corresponding pressure port of instrument 322.

Chambers 230, 30, 260, 250 and 254 as well as their associated prefilled content, are each described above respect to system 220. Each of such chambers 230, 30, 260, 250 and 254 has an associated pressure port 338 to be releasably connected to a corresponding pressure port of instrument 322 to facilitate the driving of sample 22 and SPR 31 by instrument 322. Chamber 230 is connected to chamber 30 by a conduit 256 containing at least one unidirectional or one-way valve 258. Likewise, chamber 30 is connected to sensor chamber 250 by a conduit 256 containing at least one unidirectional valve 258. Sensing chamber 250 is connected to sensor preparation chamber 260 by a conduit 256 and is also connected to waste chamber 254 by separate conduits 256, wherein each of conduits 256 contain at least one one-way valve 258 to inhibit backflow of liquid.

Instrument 322 drives sample 22 and SPS 61 and automatically in timed manner. Instrument 322 further carries out sensing of the prepared sample bound to SERS structure 51 within sensor chamber 250. Instrument 322 is designed so as to interlock with and mate with cartridge 321 such that each of pressure ports 336 and 338 of cartridge 321 are simultaneously connected to corresponding pressure ports of instrument 322. Such connection further aligns Raman spectrometer of instrument 322 with the optical window 264 and chamber 250 of sensor chamber 250 so that Raman radiation from the spectrometer may be passed through the optical window 264 onto the prepared sample 22 bound to the SERS structure 51 for carrying out Raman spectroscopy.

As schematically shown by FIG. 4, instrument 322 comprises housing 350, vacuum pump 352, air pump 354, valve bank 356, Raman spectrometer 358 and controller 360. Housing 350 comprises a panel or multiple panels and internal framework supporting the remaining components of instrument 322 as a single self-contained unit. In one implementation, housing 360 has an outer shape which interlocks with and mates with cartridge 321 in an asymmetric manner or keyed manner to ensure proper alignment and connection of instrument 322 to cartridge 321.

Vacuum pump 352 comprise a source of negative pressure connected the valve bank 356. Air pump 354 comprises a source of positive air pressure connected a valve bank 356. Valve bank 356 comprises a manifold with associated valves for selectively being opening closed to connect either vacuum pump 352 or air pump 3542 individual pressure ports 362A, 362B, 362C, 362D, 362E and 362F (collectively referred to as pressure ports 362) which are to be connected corresponding pressure ports of cartridge 321. Such valves are openable and closable in response to control signals from controller 360. Raman spectrometer 358 comprises an SERS detector, similar to SERS detector 290 described above.

Controller 360 comprises a processing unit which follows instructions contained in a non-transitory computer-readable medium to output control signals controlling the operation of valve bank 356 and spectrometer 358. In some implementations, controller 360 further controls the on-off states or the mode of operation for pumps 352 and 354. For purposes of this application, the term "processing unit" shall mean electronics or hardware that executes sequences of instructions contained in a non-transitory memory. Execution of the sequences of instructions causes the processing unit to perform steps such as generating control signals. The instructions may be loaded in a random access memory (RAM) for execution by the processing unit from a read only memory (ROM), a mass storage device, or some other persistent storage. In other embodiments, hard wired circuitry may be used in place of or in combination with software instructions to implement the functions described. For example, controller 360 may be embodied as part of one or more application-specific integrated circuits (ASICs). Unless otherwise specifically noted, the controller is not limited to any specific combination of hardware circuitry and software, nor to any particular source for the instructions executed by the processing unit.

To prepare a sample for analysis, housing 350 of instrument 322 is connected to cartridge 321 such that pressure ports 336 mate with and are pneumatically sealed and connected to pressure port 362A. At the same time, pressure ports 338 of chamber 230, chamber 30, chamber 260, and chamber 254 are also pneumatically sealed and connected to pressure ports 3626, 362C, 362D, 362E and 362F, respectively.

To begin use of system 320, a user inserts tube 330 into sample 22. In response to manual inputs or other commands, controller 360 initiates a sample preparation process by outputting control signals to valve bank 356 so as to create a vacuum within sampling chamber 328 through pressure port 362A so as to draw sample 22 through tube 330 into sampling chamber 328. In one implementation, tube 330 may include electrodes that alert controller 360 to the presence of sample 22 to automatically initiate the drawing of sample 22 through tube 330 by the creation of a vacuum in response to signals from controller 360.

Once a sufficient amount or volume of sample 22 has been drawn into chamber 328, such as indicated by a sensor within chamber 328 transmitting signals to controller 360, controller 360 closes the valve of vacuum pump 352 and/or port 362A and opens a pressure valve connecting air pump 354 to chamber 328 also opening a vacuum valve through port 362B to chamber 230. As a result, sample 22 flows from chamber 328 into chamber 230 through conduit 334 and across the one-way valve 258. In one implementation in which a sample comprises adulterated milk, the TCA within chamber 230 interacts with and precipitates the milk proteins and milk lipids.

After the sample 22 has been driven into chamber 230, controller 360 outputs control signals closing the valve connecting air pump 354 to chamber 328 and the valve connecting vacuum pump 352 to chamber 230. Controller 360 further outputs control signals connecting air pump 354 to chamber 230 and vacuum pump 352 to chamber 30. As a result, the solution flows from chamber 230 through filter 232 into chamber 30. The filter separates precipitate from the rest of the solution, separating the target analyte (which is in the liquid) from species that might otherwise interfere with the subsequent sensing of the analyte.

The SPS 61 within chamber 260 interacts with the filtered sample solution 22 within chamber 260. In one implementation, the sodium hydroxide provides a high pH overall solution having a pH of greater than 10. Thereafter, controller 360 outputs control signals actuating valves to disconnect air pump 354 from chamber 30 and to disconnect vacuum pump 352 from chamber 260. Controller 360 outputs control signals actuating valves to connect chamber 260 to air pump 354 and to connect chamber 250 to vacuum pump 352. As a result, the prepared sample 22 is drawn through the one-way valves into sensor chamber 250 to immerse structure 51. As described above with respect to system 220, in one implementation, chamber 250 comprises mixers 252 which facilitate kinetic binding which is not diffusion limited. The analyte within the sample solution 22 within chamber 250 binds to structure 51.

Once the sample solution 22 has bound to structure 51, controller 360 outputs control signals controlling valves of valve bank 356 to disconnect chamber 260 from air pump 354 and to disconnect chamber 250 from vacuum pump 352. Controller 360 outputs control signals controlling valves of valve bank 356 to connect chamber 250 to air pump 354 and to connect waste chamber 254 to vacuum pump 352 so as to draw the sample solution from chamber 250 into waste chamber 254. Once the sample solution 22 is sufficiently withdrawn from chamber 250, controller 360 disconnects chamber 250 from air pump 354 and waste chamber 254 from vacuum pump 352 with control signals transmitted to appropriate valves of valve bank 356.

After sample solution 22 has been evacuated from chamber 250, controller 360 actuates valves to connect chamber 260 to air pump 354 and to connect chamber 250 to vacuum pump 352. As a result, SPS 61 is drawn into chamber 250, washing over structure 51. After sufficient washing of structure 51 by SPS 61, controller 360, actuates valves to disconnect chamber 260 from air pump 354, to disconnect chamber 250 from vacuum pump 352, to connect chamber 250 to air pump 354 and to connect waste pump 254 to vacuum pump 352. As a result, SPS 61 is withdrawn from chamber 250 into waste chamber 254. Thereafter, controller 360 disconnects chamber 250 from air pump 354, such as the negative pressure created in chamber 250 further assist in drying structure 51. In other implementations, controller 360 260 may actuate heaters adjacent to chamber 250 or may connect chamber 2502 air pump 354 to blow hi pressurized air across structures 51 to accelerate drawing.

After sufficient drying of the structure 51 and the prepared sample bound on structure 51 so as to close the nano fingers of structure 51, controller 360 disconnects chamber 254 from vacuum pump 352 and activates the Raman spectrometer 358. Raman spectrometer 358 impinges the bound sample analyte on structure 351 with Raman radiation 371 transmitted through window 264 and collects scattered Raman radiation transmitted through optical window 264 for analysis. After such analysis, cartridge 321 may be removed and separated from instrument 322 for disposal.

Figure 5:
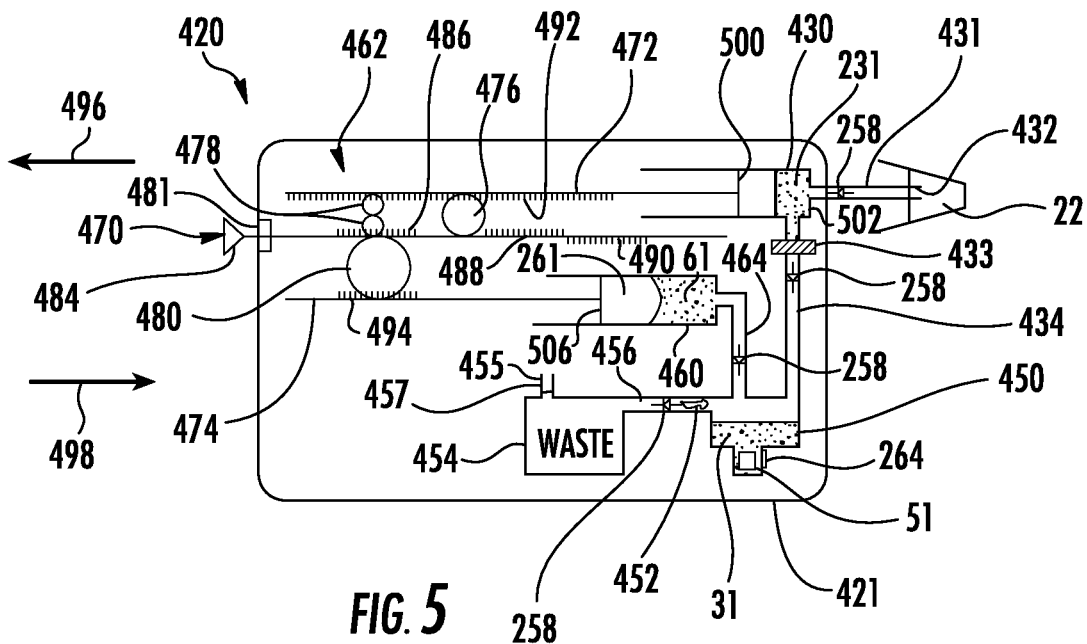
FIG. 5 is a schematic diagram of an example sample preparation system.

FIG. 5 schematically illustrates sample preparation system 420, another example implementation of system 20. System 420 comprises a mechanical self-contained device for automated preparation of a sample by extracting small molecules from complex samples to facilitate surface enhanced Raman spectroscopy. System 420 extracts small organic or inorganic molecules from complex samples such as milk, blood, cell cultures and the like, leaving behind fouling species that might otherwise interfere with surface enhanced Raman spectroscopy detection. System 420 comprises an outer housing or cartridge 421 containing a series of chambers and a mechanical actuation system. The chambers are prefilled with sample preparation reagents and a sensor preparation solution. In the example illustrated, system 420 comprises sample preparation chamber 430, filter 432, sample preparation and sensor chamber 450, phase barrier 452, waste chamber 454, sensor preparation chamber 460 and driver 462.

Sample preparation chamber 430 comprises a chamber containing prefilled sample preparation reagent comprising a precipitation agent 231. Sample preparation chamber 430 is fluidly coupled to the fill tube 431 providing an inlet 433 for cartridge 421. Tube 431 contains a one-way valve 258 which inhibits backflow of precipitation agent out of chamber 430. One-way valve 258 further inhibits flow of precipitation agent 231 into chamber 450 until precipitation agent 231 is pressurized by actuation of driver 462. Chamber 430 is fluidly connected to chamber 450 by a conduit 434 also containing a one-way valve 258 which inhibits flow of precipitation agent 231 to chamber 450 absent actuation of system 420.

Filter 432 extends across conduit 434 between chamber 430 and the one-way valve 258 within conduit 434. Like filter 232 described above, filter 432 has filter openings sized and spaced such that components or substances precipitated out of sample 22 by precipitation agent 231 cannot pass or are substantially blocked from flowing into sample preparation chamber 30. Filter 432 separates the precipitate from the rest of the solution, the precipitate comprising species that might otherwise interfere with sensing of sample 22. In one implementation, filter 432 is formed from polytetrafluoroethylene and has 100 nm sized pores. In some implementations, cartridge 421 may comprise multiple filters 232 between chambers 430 and 450, each of the filters gradually filtering out smaller size precipitate from sample 22. In one implementation, precipitation agent 231 comprises TCA which precipitates out lipids and proteins from a sample, wherein filter 432 is sized to capture and inhibit flow of such lipids and proteins.

Chamber 450 receives the filtered sample through conduit 434. Chamber 450 contains SERS structure 51. In one implementation, SERS structure 51 is in the form of a SERS chip secured within a floor of chamber 450. Chamber 450 is further initially prefilled with sample preparation reagent 31. As a result, the filtered sample 22 flowing to conduit 434 flows into and mixes with the sample preparation reagent 31 within chamber 450 and subsequently binds to SERS structure 51. In one implementation, chamber 450 additionally comprises mixers 252, such as pillars, that enhance mixing of the filtered sample 22 with SPR 31. Chamber 450 comprises an optical window 264 that facilitates the transmission of Raman radiation onto sensor structure 51 and the detection of scattered Raman radiation from SERS structure 51. Chamber 450 is connected to waste chamber 454 by conduit 456 which contains a one-way valve 258 and phase barrier 452.

Phase barrier 452 comprises a material that gas exits chamber 450 before any liquid. One-way valve 258 between phase barrier 452 and waste chamber 454 provides one-way flow from chamber 4502 waste chamber 454.

Waste chamber 454 is similar to waste chamber 254 described above. Waste chamber 454 has a gas vent 455 and a gas only filter 457. Gas vent 455 connects the interior with chamber 454 to air and atmosphere such that the pressure within the chamber 454 does not increase when liquid is pushed into the chamber, but rather remains atmospheric. Gas only filter 457 comprises a filter, such as Gore-Tex membrane, that ensures that the liquid in the waste chamber 454 stays within chamber 454 and is fully contained in cartridge 421.

Chamber 460 is similar to chamber 260 described above. Chamber 460 is fluidly coupled to chamber 450 by conduit 464 which contains a one-way valve 258. Chamber 460 contains sensor preparation solution (SPS) 61 and gas 261 described above. One-way valve 258 within conduit 464 inhibits flow of SPS 61 or gas 261 into chamber 450 until being pressurized by driver 462. In one implementation, SPS 61 comprises a washing solution, such as ethanol. In other implementations, SPS 61 may comprise other solutions that prepare SERS structure 51 for sensing.

Driver 462 comprises a manually actuatable mechanism that draws a sample 22 into cartridge 421, and that moves the sample 22 through the various chambers of cartridge 421. Driver 462 further moves SPS 61 onto the SERS structure 51 to prepare the SERS structure 51 and the bound analyte for sensing. Driver 462 provides automatic controlled timing for the injection of SPS 61 onto the SERS structure 51 based upon the progress of the movement of sample 22 through chambers 430 and 450.

In the example illustrated, driver 462 comprises actuation plunger 470, auxiliary plunger 472, auxiliary plunger 474, gear 476 transmission gears 478 and gear 480. Actuation plunger 470 is captured between gears 476, 478 and 480 which are rotatably supported by the housing of cartridge 421 and fixed in place. Actuation plunger 470 is movable in the direction indicated by arrow 496. In the example illustrated, a ratchet mechanism 481 (schematically shown) is provided between the housing of cartridge 421 and plunger 470 such that plunger 470 is movable in a single direction as indicated by arrow 496 and cannot be moved in the direction indicated by arrow 498. Complete withdrawal plunger 470 indicates that the one-time use of cartridge 421 has been exhausted. Actuation plunger 470 has an engagement portion 484 external of the housing cartridge 421 to be manually grasped by a person. In other implementations, actuation plunger 470 may be operably coupled to a separate powered actuator, such as an electric solenoid, a motor or other device which drives plunger 470.

Plunger 470 comprises a rack gear 486, rack gear 488 and rack gear 490. Auxiliary plunger 472 comprises rack gear 492 and auxiliary plunger 474 comprises rack gear 494. In the example illustrated, such gears are arranged such that the entire sample preparation process is achieved by pulling actuation plunger 470 out of cartridge 421. Prior to use of cartridge 421, plunger 470 remains in close conformity with the outer housing of cartridge 421, reducing the likelihood of plunger 470 being accidentally engaged and withdrawn. Because the likelihood of plunger 470 being accidentally withdrawn is less than the likelihood of plunger 470 being accidentally pushed into cartridge 421 (in implementations without ratchet 481), the likelihood of accidental partial initiation of sample preparation is reduced.

The various rack gears are sized, located and spaced such that as actuation plunger 470 is being withdrawn from cartridge 421 in the direction indicated by arrow 496, the motion of plunger 470 is transmitted to auxiliary plunger 472 by the interaction of rack gear 486, transmission gears 478 and rack gear 472 (which are in intermeshing engagement with one another), resulting in auxiliary plunger 474 also being driven in the direction of arrow 496 to create a vacuum within chamber 430, The vacuum created and chamber 430 is sufficient to overcome one-way valve 258, resulting in sample 22 being drawn across one-way valve 258 into chamber 430 and mixing with precipitation agent 231. During such movement, auxiliary plunger 474 remains stationary.

Continued movement of actuation plunger 470 in the direction indicated by arrow 496 disengages rack gear 486 from gears 478, resulting in the movement of auxiliary plunger 472 in the direction indicated by arrow 496 to be temporarily paused even while plunger 470 continues to be withdrawn. Continued movement of actuation plunger 470 in the direction indicated by arrow 496 brings rack gear 488 into engagement with gear 476 and results in such motion of plunger 470 being transmitted to auxiliary plunger 472 by rack gear 488, gear 476 and rack gear 492 to move auxiliary plunger 472 in the direction indicated by arrow 498. As a result, chamber 430 is sufficiently pressurized to drive sample 22 within chamber 430 across filter 432 and through one-way valve 258 (overcoming the resistance of one-way valve 258 against such flow) into chamber 450. The filtered sample solution 22 mixes with SPR 31 and analyte within sample solution 22 binds to SIRS structure 51.

Resumption or continued movement of actuation plunger 470 in the direction indicated by arrow 496 results in rack gear 488 being moved out of engagement with gear 476 (rack gear 488 being located completely to the left of gear 476 as seen in FIG. 5) and subsequently results in rack gear 490 being moved in the direction indicated by arrow 196 into engagement with gear 480. As a result, motion of actuation plunger 470 is transmitted across rack gear 490, gear 480 and rack gear 494 to move auxiliary plunger 474 in the direction indicated by arrow 498. Movement of auxiliary plunger 474 in the direction indicated by arrow 498 causes the head 506 of plunger 474 to pressurize chamber 460 such that sample 22, mixed with SPR 31, is pushed out of chamber 450 through the one-way valve 258 in conduit 456 and into waste chamber 454. Phase barrier 452 ensures that gas exits chamber 450 before any liquid leaves chamber 450.

Continued movement of plunger 470 in the direction of arrow 496 results in SPS 61 being pushed through one-way valve 258 within conduit 464 so as to wash over SERS structure 51. Further movement of auxiliary plunger 474 in the direction indicated arrow 498 creates sufficient pressure within chamber 450 to then expel SPS 61 through one-way valve 258 in conduit 456 and into waste chamber 454. Yet further movement auxiliary plunger 474 in the direction indicated by arrow 498 expels gas 261, such as air, into chamber 450, across SERS structure 51 and into waste chamber 454, wherein gas 261 enhances the drying of SERS structure 51. In implementations where SERS structure 51 comprises nano fingers as described above, capillary forces during such drying close the nano fingers. At such point in time, actuation plunger 470 may encounter a stop to inhibit further movement of actuation plunger 470 in the direction indicated by arrow 496, indicating that the target analyte of sample 21, now bound on SERS structure 51, is ready for sensing by a Raman spectrometer. The ratchet 481 inhibits plunger 470 from being pushed back into cartridge 421.

FIG. 5 illustrates just one example of system 420 and cartridge 421. In other implementations, gears 476, 478 and 480 and rack gears 486, 488, 490, 492 and 494 may have other arrangements. In other implementations, such gears may be arranged such that the entire sample preparation process may be completed in response to plunger 470 being pushed into cartridge 421 in the direction indicated by arrow 498. In yet other implementations, such gears may be arranged (spaced and located relative to one another) such that the entire sample preparation process may be completed in response to plunger 470 being alternately pushed into and withdrawn from cartridge 421. Although the motion of plunger 470 is transmitted to auxiliary plungers 472, 474 by rack and pinion gear arrangements, in other implementations, such motion may be transmitted by other mechanical transmissions.

In the example illustrated, gears 476, 478 and 480 and rack gears 486, 488, 490, 492 and 494 are arranged such that the entire sample preparation process may be completed by a person manually withdrawing plunger 470 in one continuous motion, without interruption or pause, wherein the spacing between the various rack gears of plungers 470, 472 and 474 and their length control the timing at which the different sample preparation stages are initiated and completed. In other implementations, the person may be instructed as to when to pull (or push, in some implementations) actuation plunger 470 and when to pause such actuation. For example, in one implementation, cartridge 421 may comprise a photo emitter-detector sensor sensing the position of actuation plunger 470 and/or auxiliary plungers 472, 474. In some implementations, plunger 470 and either or both of plungers 472, 474 may include one of a bump or notch which engage the other of a bump or notch, wherein the bump and the notch interact with one another during movement of plunger 470 to provide the user moving with an audible sound or tactile sensation indicating positioning of the plungers. In some implementations, portions of the housing cartridge 421 may be transparent at locations so as to permit viewing of the different locations of plunger 470 and/or plungers 472, 474 within cartridge 421. In such implementations, portions of housing of cartridge 421 may include markers or indicators indicating different depths or start and stop points for plunger 470 and/or plungers 472, 474. In one implementation, cartridge 421 may comprise a timer which is activated upon or in response to signals received from a sensor that senses the positioning of plunger 470, plungers 472, 474 and/or the presence or absence of liquids at selected locations within cartridge 421. In such an implementation, a controller, such as an ASIC, provided as part of cartridge 421, may utilize signals from the timer to provide an output, such as lighting of an LED, an audible signal or other indication, to the user to indicate when the user should initiate, pause and/or resume manual movement of actuation plunger 470.

Figure 6:
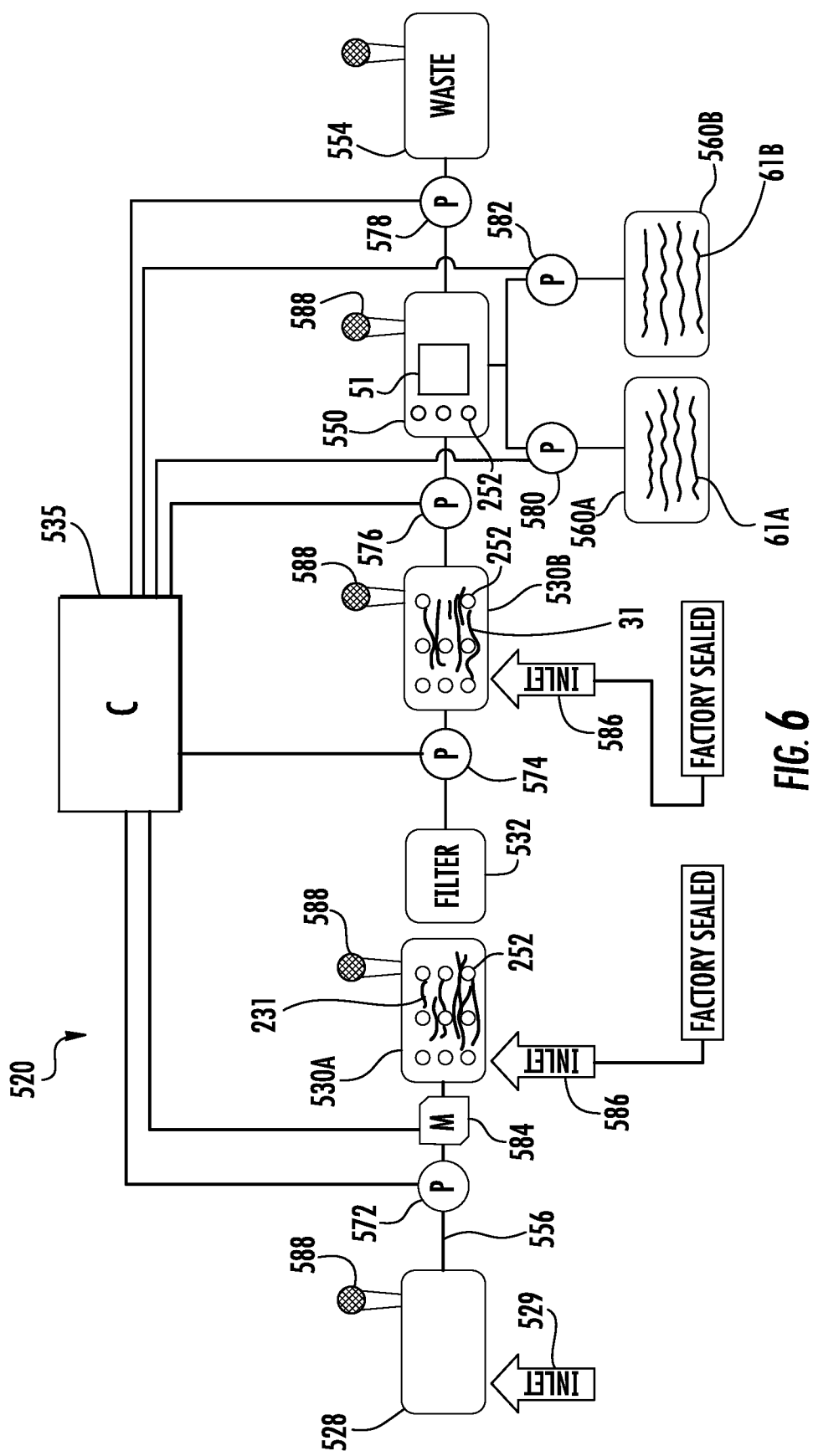
FIG. 6 is a schematic diagram of an example sample preparation system.

FIG. 6 schematically illustrates an example sample preparation system 520, another implementation of system 20. System 520 is similar to system 320 except that system 520 comprises a single self-contained unit which utilizes internal pumps to move the sample and liquids. As shown by FIG. 6, the example system 520 comprises sampling chamber 528 (also referred to as a sample reservoir), sample preparation chamber 530A, sample preparation chamber 530B, filter 532, sensor chamber 550, waste chamber 554, sensor preparation chambers 560A, 560B, pumps 572, 574, 576, 578, 580 and 582, sample measurement device 584 and controller 585.

Sampling chamber 528 is similar to sampling chamber 328 described above. Sampling chamber 528 receives a sample 22 (shown in FIG. 4) to be analyzed. Sample 528 has an inlet 529 through which the sample is provided to chamber 528. In one implementation, pump 572 is actuated to draw a sample through inlet 529, into chamber 528 and to chamber 530A.

Sample preparation chambers 530A and 530B are similar to sample preparation chambers 230 and 30, respectively of system 320. Chamber 530A is prefilled with the sample preparation reagent, such as a precipitating agent 231. Chamber 530B is prefilled with a sample preparation reagent 31. In the example illustrated, both of chambers 530 are filled through an inlet 586 which is subsequently factory sealed.

Sensor chamber 550 is similar to sensor chamber 250 described above. Sensor chamber 550 contains an SERS structure 51 and includes an optical window through which analyte bound on SERS structure 51 may be impinged with Raman radiation and through which scattered radiation may be received by a Raman spectrometer. Waste chamber 554 is similar to waste chamber 254 described above. Chambers 528, 530, 550 and 554 are arranged in a series, connected by conduits 556, allowing the sample to be driven through and across each of the chambers in a sequential fashion. Each of chambers 528, 530, 550 and 554 are further provided with a nozzle or gas vent 588.

Sensor preparation chambers 560 are each similar to sensor preparation chamber 260. Sensor preparation chambers 560A, 560B contain sensor preparation solutions 61A and 61B, respectively. In one implementation, solutions 61A and 61B are identical to one another, wherein these solutions are sequentially applied to structure 51 in chamber 550 to SERS structure 51. In another implementation, solutions 61A and 61B have different compositions or makeups, wherein each solution interacts with structure 51 and the analyte bound on structure 51 differently to prepare the analyte bound on structure 51 for being sensed.

Pumps 572, 534, 576, 578, 580 and 582 comprise devices to pump liquid. In one implementation, pumps 572, 534, 576, 578, 580 and 582 comprise bubble jet resistor pumps. In other implementations, such pumps may comprise inertial pumps. In yet other implementations, pumps 572, 534, 576, 578, 580 and 582 may comprise piezoresistive pumps. In still other implementations, pumps 572, 534, 576, 578, 580 and 582 may comprise other forms of pumping devices.

Measurement device 584 comprises a device to sense or measure the amount of sample transmitted through the conduit 556 between chamber 528 and chamber 530A. In one implementation measurement device 584 comprises a volume meter or a flow meter. In some implementations, measurement device 584 may be omitted.

Controller 585 comprises a processing unit that controls the operation of pumps 572, 534, 576, 578, 580 and 582, to carry out a process for preparing the sample for analysis. In operation, controller 585, upon receiving a command from a user to begin sample preparation, outputs control signals causing pump 572 to draw the sample into the chamber 528 and into chamber 530A where the sample mixes with the precipitation agent 231, precipitating out unwanted substances. Thereafter, controller 535 outputs control signals directing pump 574 to further pump the sample solution through filter 532 and into chamber 530B. Filter 522 removes the precipitate. In chamber 530B, the sample solution mixes with SPR 31. Thereafter, controller 535 outputs control signals directing pump 576 to further pump the sample solution into sensor chamber 550 and onto SERS structure 51.

Once analyte within the sample solution has resided within chamber 550 for sufficient time for sufficient binding of analyte within the sample solution to SERS structure 51, controller 525 outputs control signals directing pump 578 to pump the sample solution into waste chamber 554. Thereafter, controller 535 outputs control signals directing pump 582 pump sensor preparation solution 61A into chamber 550. Controller 535 further directs pump 578 to pump solution 61A out of chamber 550 into waste chamber 554. Thereafter, controller 535 further directs pump 582 to pump solution 61B into chamber 550. In one implementation, controller 535 may further direct pump 578 to pump solution 61B out of chamber 550 into waste chamber 554.

In response to solution 61B being discharged from chamber 550, such as in response to signals from a sensor indicating the discharge of solution 61B or in response to a predetermined time following the initiation of pumping by pump 578, controller 535 outputs control signals to enhance drying of structure 51 and the analyte bound upon structure 51. In one implementation, controller 535 outputs control signals causing a vacuum source to apply a vacuum to chamber 553 vacuum port. In another implementation, controller 535 outputs control signals to an air pump two pump pressurized air into and across chamber 550. In yet another implementation, controller 535 actuates heaters within our along chamber 555 to facilitate drying. In implementations where SERS structure 51 comprises nano fingers, such drying because the nano fingers to close. At such time, the analyte bound upon structure 51 is ready for being sensed by a Raman spectrometer.

In one implementation, chamber 528 has a volume of between 10 nl and 10 ml, and in one implementation, 5 µL, chamber 530A has a volume of between 10 nl and 10 ml, and in one implementation, 10 µL and is filled with 5 µL of precipitation agent to 31. Chamber 530B has a volume of between 10 nl and 10 ml, and in one implementation, 20 µL, while is prefilled with 10 µL of SPR 31. Chamber 550 has a volume of between 10 nl and 10 ml, and in one implementation, 20 µL, chamber 554 has a volume of between 10 nl and 10 ml, and in one implementation, 500 µL, and chambers 61 each have a volume of between 10 nl and 10 ml, and in one implementation, 100 µL, each being prefilled with 100 µL of sensor preparation solutions 61. In one implementation, each of the conduits 556 connecting the various chambers have a diameter of 50 µm. In one implementation, each of chambers 530A, 530B and 550 include passive mixers, such as mixers 252 described above. In other implementations, each of such chambers may have other volumes. In other implementations, conduit 556 may have other diameters.

In the example illustrated, filter 532 comprises 200 nm pores, having a filter area of 1 $cm^2$, a thickness of 200 µm and a proxy of 0.5. In one implementation, filter 532 is formed from polytetrafluoroethylene. In other implementations, filter 532 may have other characteristics.

Figure 7:
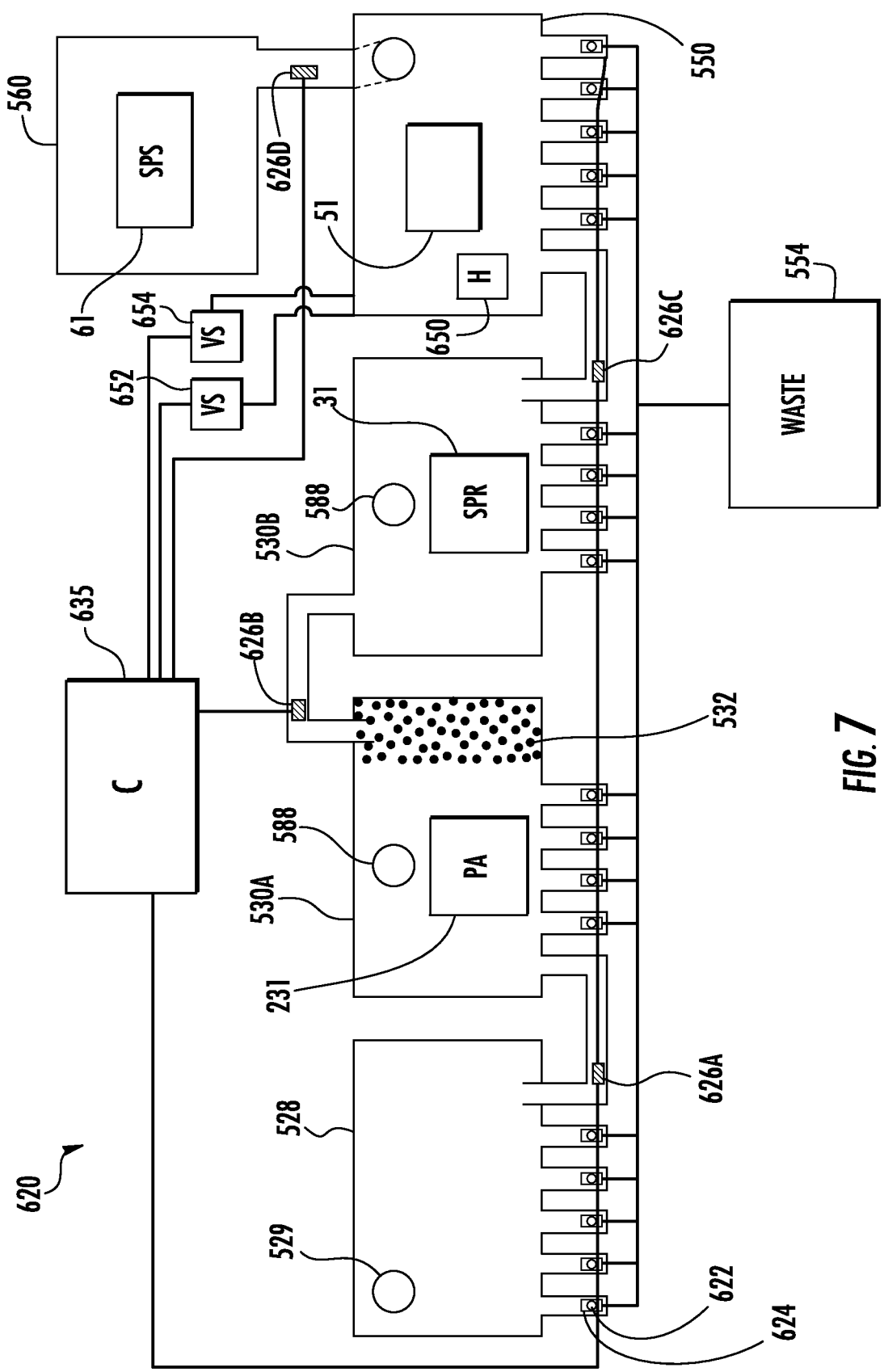
FIG. 7 is a schematic diagram of an example sample preparation system.

FIG. 7 schematically illustrates an example sample preparation system 620. System 620 is similar to system 520 except that system 620 is specifically illustrated as utilizing bubble jet resistors as pumps, either as inertial pumps or in combination with associated nozzles. Those components of system 620 which correspond to components of system 520 are numbered similarly.

In the example illustrated, each of chambers 528, 530A, 530B and 550 comprises a bubble jet resistors 622 and associated nozzles 624 which serve as pumps to eject liquid into waste chamber 554 and, at the same time, draw liquid into the corresponding chamber. In other implementations, the bubble jet resistors 622 and associated nozzles 624 of chambers 528, 530A and 530B may be omitted. In some implementations, the bubble jet resistors 622 and associated nozzles 624 of chamber 550 may also be omitted where a separate pump, such a bubble jet inertial pump, is provided to discharge liquid from chamber 552 waste 554. System 620 additionally comprises bubble jet inertial pumps 626A, 626B, 626C and 626D (collectively referred to as inertial pump 626) which are located within the conduits connecting adjacent chambers. For purposes of this disclosure, the term "inertial pump" refers to a pumping device that initially drives fluid in both directions within a channel that is relatively narrow to the reservoirs it connects, but wherein the pumping device is asymmetrically positioned between the reservoirs such that the end result is fluid being driven in a direction towards the most distant of the two reservoirs.

Controller 635 is similar to controller 535 of system 520 described above. In operation, controller 635, upon receiving a command from a user to begin sample preparation, outputs control signals firing bubble jet resistors 622 to eject liquid within the chamber 528 to waste chamber 554 and thereby draw a new sample through inlet 529. Controller 635 further outputs control signals to bubble jet inertial pump 626A which pumps the sample into chamber 530A where the sample mixes with the precipitation agent 231, precipitating out unwanted substances or molecules. Thereafter, controller 635 outputs control signals directing inertial pump 626B to further pump the sample solution through filter 532 and into chamber 530B. Filter 522 removes the precipitate. In chamber 530B, the sample solution mixes with SPR 31. Thereafter, controller 635 outputs control signals directing inertial pump 626C to further pump the sample solution into sensor chamber 550 and onto SERS structure 51.

Once analyte within the sample solution has resided within chamber 550 for sufficient time for sufficient binding of analyte within the sample solution to SERS structure 51, controller 635 outputs control signals directing bubble jet resistors 622 adjacent chamber 550 to eject the sample solution through corresponding nozzles 624 into waste chamber 554. Thereafter, controller 635 outputs control signals directing inertial pump 626D to pump sensor preparation solution 61A into chamber 550, submersing SERS structure 51. Controller 635 further directs bubble jet resistors 622 adjacent chamber 550 to eject the SPS 61 through corresponding nozzles 624 into waste chamber 554.

Upon discharge of SPS 61 from chamber 550, controller 635 output control signals directing mechanisms to facilitate drying of SERS structure 51. In one implementation, controller 635 outputs control signals directing a heater 650 (schematically shown) to apply heat to the interior chamber 550 to facilitate drying of SERS structure 51. In one implementation, controller 535 outputs control signals causing a vacuum source 652 (schematically shown) to apply a vacuum to chamber 550 through a vacuum port. In another implementation, controller 535 outputs control signals to an air pump 652 to pump pressurized air into and across chamber 550. In implementations where SERS structure 51 comprises nano fingers, such drying may cause the nano fingers to close.

Upon sufficient drying of structure 51, the analyte of the sample bound to SERS structure 51 is ready for being analyzed, wherein Raman radiation, such as light, is directed through an optical window of chamber 550 onto structure 51 and wherein light scattered by the analyte on structure 51 is transmitted through the optical window and is collected by the Raman spectrometer for analysis.

Figure 8:
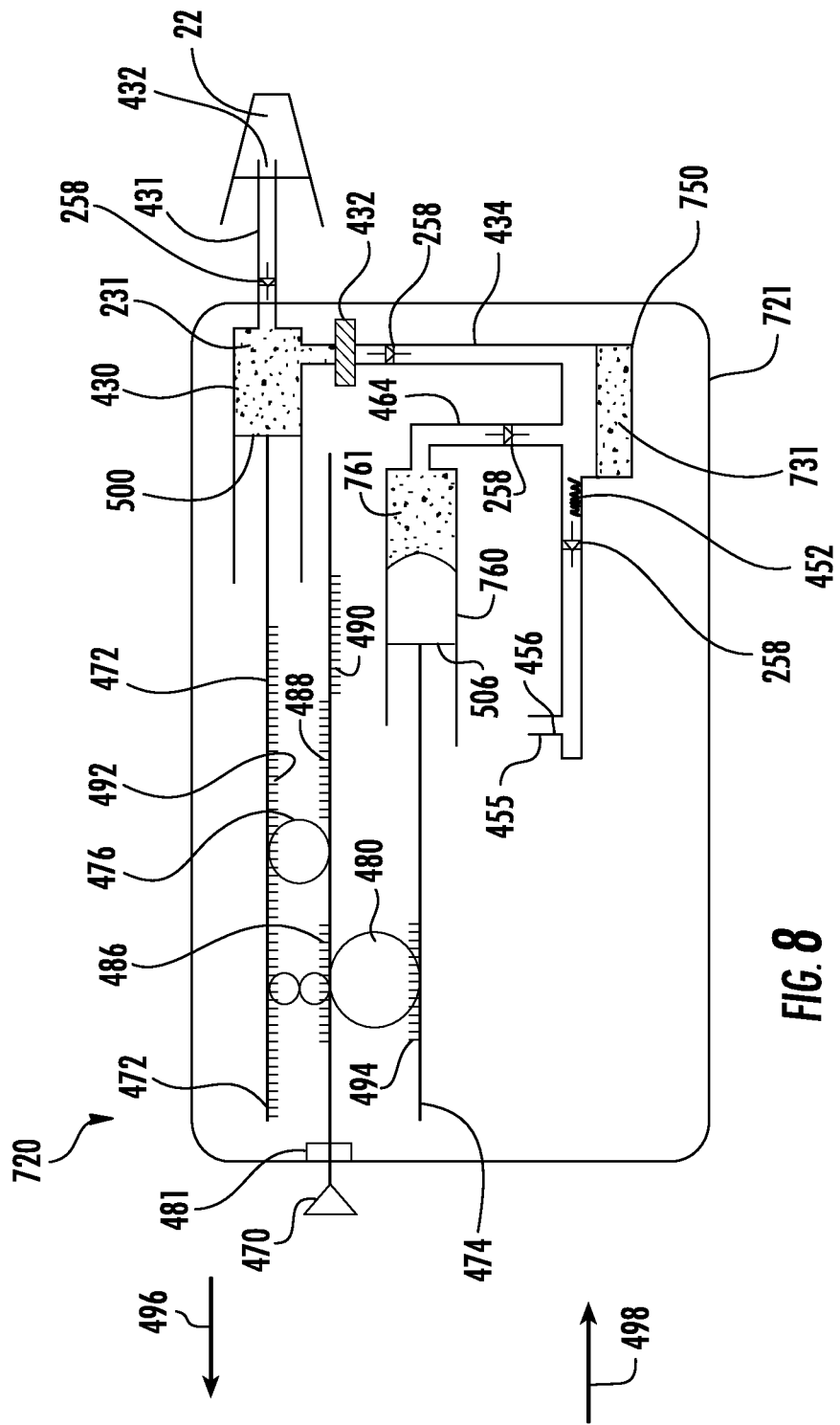
FIG. 8 is a schematic diagram of an example sample preparation system.

FIG. 8 schematically illustrates an example sensor preparation system 720. System 720 facilitates fluorescence sensing of a sample 22. System 720 is similar to system 420 described above except that system 720 comprises omits waste chamber 454 and omits SERS structure 51. In lieu of sensor chamber 450 and sensor preparation chamber 460, system 720 comprises sensor chamber 750 and sensing preparation chamber 760. Those remaining components of system 720 which correspond to components of system 420 are numbered similarly.

In the example illustrated, cartridge 721 is described for facilitating fluorescence sensing of a complex sample to identify the existence of melamine. In other implementations, the chambers of cartridge 721 may be prefilled with different solutions depending upon the liquid being analyzed, Sensor chamber 750 of system 720 is similar to sensor chamber 450 of system 420 except that sensor chamber 750 is prefilled with a pH adjustment buffer 731. Sensing preparation chamber 760 is similar to chamber 460 except that chamber 760 is prefilled with a solution 761 containing thioglycolic acid capped CdTe quantum dots and Au nanoparticles. In one implementation, the solution comprises thioglycolic acid capped CdTe quantum dots and Au nanoparticles.

The operation of cartridge 721 is substantially similar to that as described above with respect to the operation of cartridge 421. As plunger 470 is initially withdrawn, sample 22 is drawn through tube 431 into chamber 430 where the sample 22 mixes with the precipitation agent 231. Further withdrawal of plunger 470 results in the sample 22 being pushed across filter 432 and into sensor chamber 750, where the filtered sample mixes with the pH adjustment buffer 731. Further withdrawal of plunger 470 results in the injection of solution 761 into sensor chamber 750 so as to mix with mixture of the sample 22 and the pH adjustment buffer. In the absence of melamine, the AuNP from solution 761 quenches the fluorescence of the CdTe quantum dots. However, the presence of melamine induces aggregation and corresponding absorbance change of the AuNPs in solution 61 which results in the recovery of emission of CdTe QEs.

Although the present disclosure has been described with reference to example implementations, workers skilled in the art will recognize that changes may be made in form and detail without departing from the spirit and scope of the claimed subject matter. For example, although different example implementations may have been described as including one or more features providing one or more benefits, it is contemplated that the described features may be interchanged with one another or alternatively be combined with one another in the described example implementations or in other alternative implementations. Because the technology of the present disclosure is relatively complex, not all changes in the technology are foreseeable. The present disclosure described with reference to the example implementations and set forth in the following claims is manifestly intended to be as broad as possible. For example, unless specifically otherwise noted, the claims reciting a single particular element also encompass a plurality of such particular elements. The terms "first", "second", "third" and so on in the claims merely distinguish different elements and, unless otherwise stated, are not to be specifically associated with a particular order or particular numbering of elements in the disclosure.

What is claimed is:

1. A sample preparation system comprising:
    a sample input for reception of a sample containing a target analyte;
    a first chamber fluidly coupled to the sample input and containing a sample preparation reagent prior to introduction of any sample through the sample input;
    a second chamber containing a surface enhanced Raman spectroscopy (SERS) sensor structure prior to introduction of any sample through the sample input, the SERS sensor structure to bind to the target analyte;
    a third chamber containing a sensor preparation solution prior to introduction of any sample through the sample input, the sensor preparation solution to leave the target analyte bound to the SERS sensor structure,
    wherein the sample input, the first chamber and the second chamber are fluidly coupled to one another in a series and the third chamber is fluidly coupled to the second chamber outside of the series; and
    a fluid driver to sequentially (1) drive and direct the sample received by the sample input, through the first chamber to the second chamber and out of the second chamber, (2) to direct the sensor preparation solution into the second chamber following discharge of the sample out of the second chamber, and (3) direct the sensor preparation solution out of the second chamber while leaving the target analyte bound on the SERS sensor structure for subsequent sensing.

2. The sample preparation system of claim 1 further comprising a waste chamber fluidly coupled to the second chamber in the series to receive the sample being discharged out of the second chamber.

3. The sample preparation system of claim 1 further comprising a filter between the first chamber and the second chamber.

4. The sample preparation system of claim 3, wherein the sample preparation reagent comprises a precipitation agent.

5. The sample preparation system of claim 1 further comprising a fourth chamber containing a second sample preparation agent prior to introduction of any sample through the sample input, wherein the fourth chamber is in the series between the first chamber and the second chamber, wherein the driver is to sequentially direct the sample from the first chamber to the fourth chamber and from the fourth chamber to the second chamber.

6. The sample preparation system of claim 1, wherein the second chamber comprises an optical window through which portions of the sample on the SERS sensor structure are to be impinged by SERS radiation.

7. The sample preparation system of claim 1 comprising a one-way valve between each of the sample input and the first chamber, the first chamber and the second chamber, and the second chamber and the third chamber.

8. The sample preparation system of claim 1 further comprising mixers comprising pillars within the second chamber.

9. The sample preparation system of claim 1, wherein the driver comprises:
a first plunger to be drawn in a first direction to draw a sample through the sample input and to be drawn in a second opposite direction to sequentially move the sample through the first chamber and into the second chamber; and
a second plunger; and
a third plunger operably coupled to the first plunger and the second plunger, wherein movement of the third plunger in a single direction sequentially draws the first plunger in the first direction and the second direction and drives the second plunger (1) to move the sample out of the second chamber, and (2) to subsequently move the sensor preparation solution within the third chamber into the second chamber, across the portions of the sample on the SERS structure and out of the second chamber.

10. The sample preparation system of claim 1 further comprising:
a cartridge comprising a body comprising the sample input, the first chamber, the second chamber and the third chamber; and
a sensing instrument to releasably interlock and mate with the cartridge; the sensing instrument comprising:
the driver; and
a Raman spectrometer located to sense the SERS sensor structure in the second chamber when the cartridge is releasably interlocked and mated to the sensing instrument.

11. The sample preparation system of claim 10, wherein the driver comprises:
a vacuum pump;
an air pump;
a valve bank; and
a controller to output control signals causing the valve bank to selectively connect the air pump and the vacuum pump to the cartridge to sequentially direct a sample received by the sample input through the first chamber to the second chamber and out of the second chamber and so as to direct the sensor preparation solution into the second chamber following discharge of the sample out of the second chamber.

12. The sample preparation system of claim 1 comprising a platform supporting the sample input, the first chamber, the second chamber, the third chamber and the driver, wherein the driver comprises an inertial pump.

13. The sample preparation system of claim 12, wherein the inertial pump comprises a first bubble jet resistor and wherein the driver further comprises a fluid ejector that comprises a nozzle and a second bubble jet resistor to discharge fluid through the nozzle.

14. The sample preparation system of claim 1, wherein the driver is to drive a gas across the SERS sensor structure in the second chamber following expulsion of the sensor preparation solution from the second chamber.

15. The sample preparation system of claim 14, wherein the driver comprises a plunger.

16. The sample preparation system of claim 1, wherein the driver comprises a manually actuatable plunger.

17. A sample preparation system comprising:
a sample input;
a first chamber fluidly coupled to the sample input and containing a sample preparation reagent;
a second chamber containing a surface enhanced Raman spectroscopy (SERS) sensor structure;
a third chamber containing a sensor preparation solution, wherein the sample input, the first chamber and the second chamber are fluidly coupled to one another in a series and the third chamber is fluidly coupled to the second chamber outside of the series; and
a driver to sequentially direct a sample received by the sample input through the first chamber to and through the second chamber and out of the second chamber and to direct the sensor preparation solution into the second chamber following discharge of the sample out of the second chamber, wherein the driver comprises:
a first plunger to be drawn in a first direction to draw a sample through the sample input and to be drawn in a second opposite direction to sequentially move the sample through the first chamber and into the second chamber; and
a second plunger operably coupled to the first plunger so as to be driven by motion of the first plunger and so as (1) to move the sample out of the second chamber, (2) to subsequently move the sample sensor preparation solution within the third chamber into the second chamber, across the portions of the sample on the SERS sensor structure and out of the second chamber and (3) to move a gas over the SERS sensor structure to dry the SERS sensor structure.

18. The sample preparation system of claim 17 further comprising a third plunger operably coupled to the first plunger and the second plunger to drive the first plunger and the second plunger.

19. A sample preparation system comprising:
a sample input;
a first chamber fluidly coupled to the sample input;
a second chamber;
a third chamber, wherein the sample input, the first chamber and the second chamber are fluidly coupled to one another in a series and the third chamber is fluidly coupled to the second chamber outside of the series; and
a driver to sequentially direct a sample received by the sample input through the first chamber to the second chamber and out of the second chamber and to direct contents of the third chamber into the second chamber following discharge of the sample out of the second chamber, wherein the driver comprises:
a first plunger to be drawn in a first direction to draw a sample through the sample input and to be drawn in a second opposite direction to sequentially move the sample through the first chamber and into the second chamber; and
a second plunger; and
a third plunger operably coupled to the first plunger and the second plunger, wherein movement of the third plunger in a single direction sequentially draws the first plunger in the first direction and the second direction and drives the second plunger (1) to move the sample out of the second chamber, (2) to subsequently move the contents of the third chamber into the second chamber and out of the second chamber.

* * * * *